UNITED STATES PATENT OFFICE.

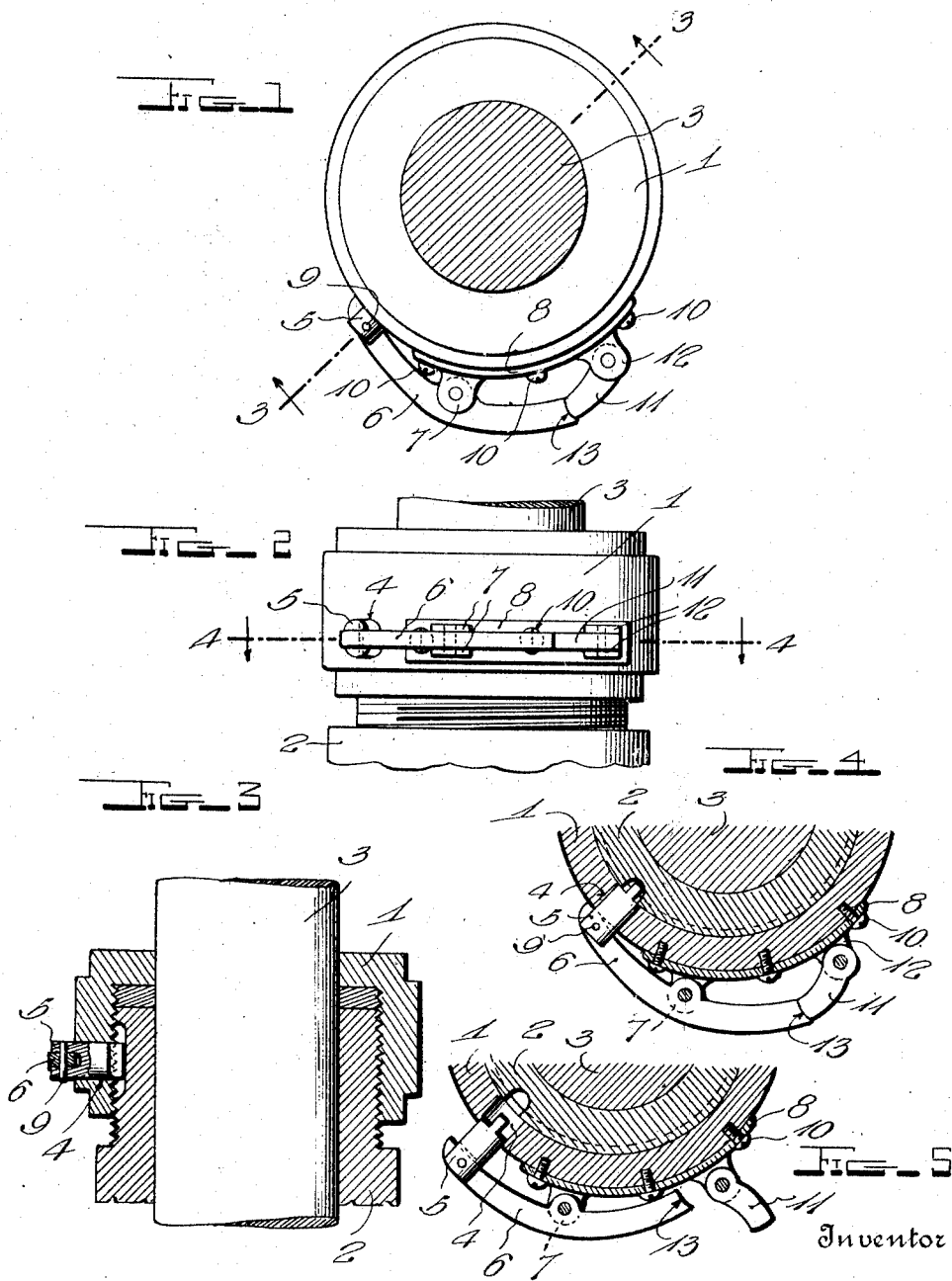

LEWIS E. WISDOM, OF MOBERLY, MISSOURI.

NUT-LOCK.

1,366,232.     Specification of Letters Patent.     Patented Jan. 18, 1921.

Application filed June 28, 1920. Serial No. 392,424.

*To all whom it may concern:*

Be it known that I, LEWIS E. WISDOM, a citizen of the United States, residing at Moberly, in the county of Randolph and State of Missouri, have invented certain new and useful Improvements in Nut-Locks; and I do declare the following to be a full, clear, and exact description of the invention, such as will enable others skilled in the art to which it appertains to make and use the same.

This invention relates to an improved nut lock, and one object of the invention is to provide a nut lock which may be used in connection with a coupling gland or in connection with an ordinary securing nut the locking element being so constructed that it may be securely but releasably held in a locking position and prevented from accidentally moving to a releasing position.

Another object of the invention is to so construct the device that the securing tooth may be carried by a lever pivotally mounted upon a bracket, which bracket also carries a device for engaging the lever and releasably holding the lever against movement when the tooth is in an operative position.

Another object of the invention is to so construct this device that it may be easily applied to the securing nut.

Another object of the invention is to so construct the device that it will consist of a comparatively few number of parts and to so construct it that it will be very efficient in operation and not liable to easily break or get out of order.

This invention is illustrated in the accompanying drawings, wherein:

Figure 1 is a view showing a coupling gland in end elevation with the improved locking means associated with the same.

Fig. 2 is a view showing the structure of Fig. 1, in side elevation.

Fig. 3 is a longitudinal sectional view taken along the line 3—3 of Fig. 1.

Fig. 4 is a sectional view taken along the line 4—4 of Fig. 2, with the locking device in an operative position, and Fig. 5 is a similar view showing the locking device in an inoperative position.

This invention consists of a device for locking a nut or gland 1 upon a bolt or hollow shaft 2 when the device is used as shown for mounting the shaft 3. This cap or gland 1 is provided with a side opening 4 in which is slidably mounted a tooth 5, the inner end of which is reduced for fitting into a longitudinally extending groove formed in the threaded portion of the bolt or threaded shaft 2. In order to movably mount the tooth 5, there has been provided a lever 6 which is pivotally mounted between the ears 7 of the bracket 8 and has one end extending through a slot formed in the outer end portion of the tooth 5 and pivotally connected with the tooth by a pin 9. This bracket is connected with the nut or cap 1 by fasteners 10 and will be formed to fit in close contact with the nut or cap. In the present disclosure, the bracket is curved longitudinally so that it will fit in close engagement with the curved walls of the cap 1 but it is to be understood that if the device were used in connection with a nut having flat wrench-engaging faces, the bracket would be flat instead of curved. A locking arm 11 is pivotally mounted between the ears 12 adjacent the end of the bracket 8 and is provided with a curved free end so that when the lever 6 has been swung to move the tooth 5 to the locking or operative position as shown in Fig. 4, the securing arm or finger 11 may be swung from the position of Fig. 5 to that of Fig. 4, thus causing its curved end to pass into close engagement with the free end of the lever. This free end of the lever is curved thus providing a pocket 13 for receiving the end of the finger 11. It will thus be seen that when the finger is moved into the operative position, it must be forced into proper engagement with the lever, and therefore, a binding action will be created which will prevent this locking finger from accidentally moving to a releasing position. In addition to being used as a nut lock and for securing a coupling gland in place, the device may be used in connection with other articles which are screw-threaded in place. One example of a device which could be secured by this improved fastener, is a radiator cap for an automobile radiator. When the device is in the locking position and the tooth is extended into a longitudinally extending groove formed in the threaded portion of the bolt or sleeve through which the shaft extends, the nut will be securely held in place against turning in either direction. It is a simple matter, however, to pry the securing arm loose so that it may be swung out of engagement with the free end of the lever and the lever then moved to draw the securing tooth 5 outwardly to the releasing or inoperative position as shown in Fig. 5. It will thus be seen that a locking device may be provided which is very efficient in operation but at the same time is comparatively simple in construction.

What is claimed is:

In a device of the character described, a threaded member having a recess formed in its threads, an internally threaded securing member carried thereby and provided with a side opening for registering with the recess, a bearing bracket connected with the side of the securing member and extending circumferentially thereof, a lever pivotally mounted adjacent one end of the bearing bracket and having a locking tooth at its outer end slidably mounted in the opening of the securing member, the inner end portion of the lever extending longitudinally of and terminating intermediate the length of the bearing bracket, and a locking finger pivotally mounted adjacent the second end of the bearing bracket and extending longitudinally thereof for end to end engagement with the inner end of the lever when the lever is moved to extend its locking tooth inwardly to fit into said recess and hold the lever against movement to bring the tooth outwardly to an inoperative position.

In testimony whereof I have hereunto set my hand in the presence of two subscribing witnesses.

LEWIS E. WISDOM.

Witnesses:
J. S. WOLDEN,
WILLARD P. CAVE.